United States Patent [19]

Corompt et al.

[11] Patent Number: 4,762,370
[45] Date of Patent: Aug. 9, 1988

[54] TIPPING DEVICE TO CONTROL THE TIPPING OF A BODY MOUNTED ON A VEHICLE

[75] Inventors: Antoine Corompt; Jean Lablanche; Fernand Michalon, all of Saint Etienne, France

[73] Assignee: Bennes Marrel, France

[21] Appl. No.: 893,020

[22] Filed: Jul. 31, 1986

[30] Foreign Application Priority Data

Jul. 31, 1985 [FR] France ................................ 85 12056

[51] Int. Cl.⁴ .............................................. B60P 1/20
[52] U.S. Cl. ................................. 298/19 R; 298/19 B; 298/22 P; 298/22 B
[58] Field of Search .................. 298/19 B, 22 P, 22 B, 298/22 D, 22 J, 19 R

[56] References Cited

U.S. PATENT DOCUMENTS

2,603,518 7/1952 Golay ................................. 298/19 B
4,029,358 6/1977 Bergdolt ........................... 298/19 B

Primary Examiner—Robert J. Spar
Assistant Examiner—Janice Krizek
Attorney, Agent, or Firm—Remy J. VanOphem

[57] ABSTRACT

A tipping apparatus for a truck body includes a piston and cylinder type thrustor connected at one end to the truck body and connected at its other end to a slide on the truck chassis. Initial extension of the thrustor is converted, via a triangular push rod pivoted on the chassis and linked at one end to the slide thereby providing to a substantially vertically upward lifting force on the truck body.

19 Claims, 6 Drawing Sheets

TIPPING DEVICE TO CONTROL THE TIPPING OF A BODY MOUNTED ON A VEHICLE

BACKGROUND OF THE INVENTION

1. Field of the Invention

This invention concerns a new type of tipping device controlling the tipping of a body on the chassis which carries it. It deals, more particularly, although not exclusively, with instances where the carrying chassis is a truck, trailer or semi-trailer.

2. Description of the Prior Art

Tipping devices mounted between the carrying chassis of a truck and the lower part of a tipping body are known already, in particular French Pat. No. 1 453 849.

We know that such a device must first satisfy the clearance space requirements. It has to be possible to mount it on an existing truck without the necessity of modifying the chassis. It has to fit into a minimum amount of height, under the tray or floor of a standard tipping body or container. As the device rests on the chassis of the truck at one end and the under part of the tipping body at the other, neither of these standard units should need elaborate reinforcing due to too much force being used in its operation. Because of these considerations, the one or more principal tipping thrustors occupy a position only slightly inclined towards the horizontal when the body rests horizontally on the truck. Because of this, the one or more principal thrustors operate with a minimum amount of leverage at the start of the initial lift at the time when the effort required of the principal thrustor is at its maximum. It is, therefore, this particular moment of operation which is taken into consideration when calculating what the size of the principal thrustor should be, as well as the various parts and joints which bear the load pressure exerted. Consideration must be given to the weight and cost of these various elements. The advantage of reducing the thrust of the principal thrustor is easily understood, this thrust being needed at the start of the cycle, i.e. the moment at which the body starts to lift.

SUMMARY OF THE INVENTION

The aim of this invention is to solve these problems, and create a tipping device which will reduce the maximum thrust required from the principal thrustors at the moment the body starts to lift.

A tipping device in accordance with the invention is placed between a fixed lower chassis and an upper tipping tray, is articulated at the rear of the chassis, and includes at least one hydraulic thrustor and at least one triangular push rod.

The thrustor is articulated at one end under the tipping tray and at the other end at an apex of the triangular push rod.

The triangular push rod is articulated at a second apex on an axle on the chassis, while a third apex is equipped with at least one roller which runs along the bottom of the tray to exert an elevating thrust.

According to another embodiment of the invention, the thrustor is equipped, close to its lower extremity, with a transversal axle on which the first apex, of the single or several triangular push rods are articulated.

According to another embodiment of the invention the thrustor is connected, by a transversal bearing at one end of a tie rod, the other end being articulated on the first apex of the triangular push rod. The transversal bearing rests on the chassis along which it moves during the operation. The movement may be on rollers or on a sliding block along slides in the chassis.

It can be seen that in all cases the device operates at the initial moment of lift, i.e. from the rest position when the tray is resting on the chassis. During the initial rise, it operates as follows:

The thrustor lifts the tray on which it is directly articulated at the upper extremity, and the lower extremity of the thrustor actuates the push rod so that the third summit of this push rod gives an added thrust to the rise.

BRIEF DESCRIPTION OF THE DRAWINGS

The attached drawings, given as examples but in no way limiting, will help to better understand the teachings of the invention.

DETAILED DESCRIPTION OF THE PREFERRED EMBODIMENT

Figure 1:
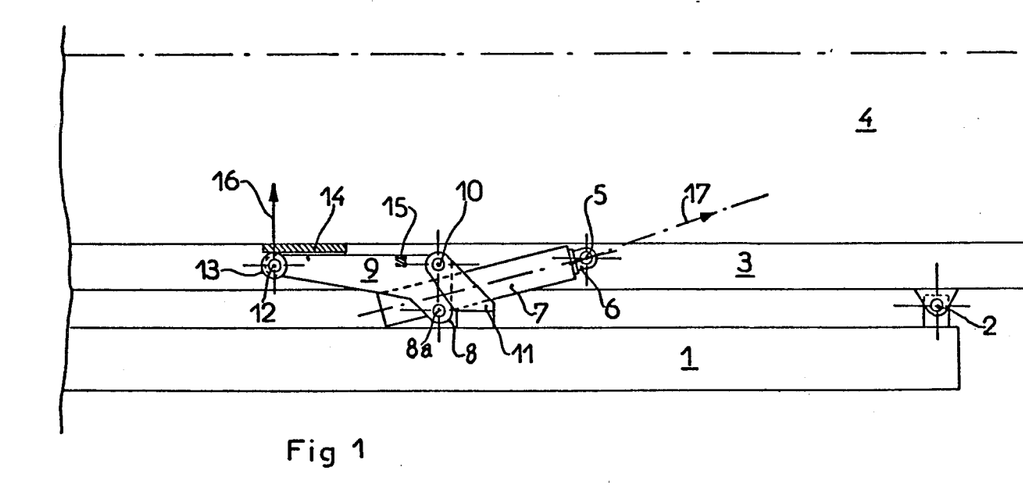
FIGS. 1 to 3 are a diagrammatic representation of the invention which show the successive phases of operation of a tipping device in accordance with the invention.
Figure 2:
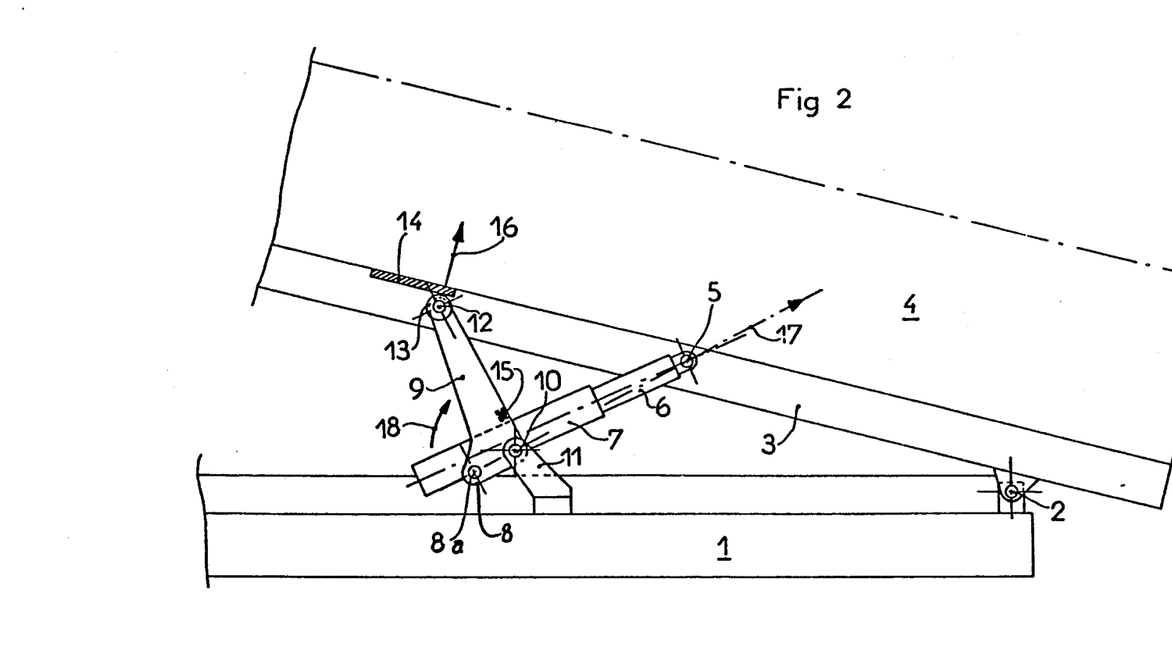
Figure 3:
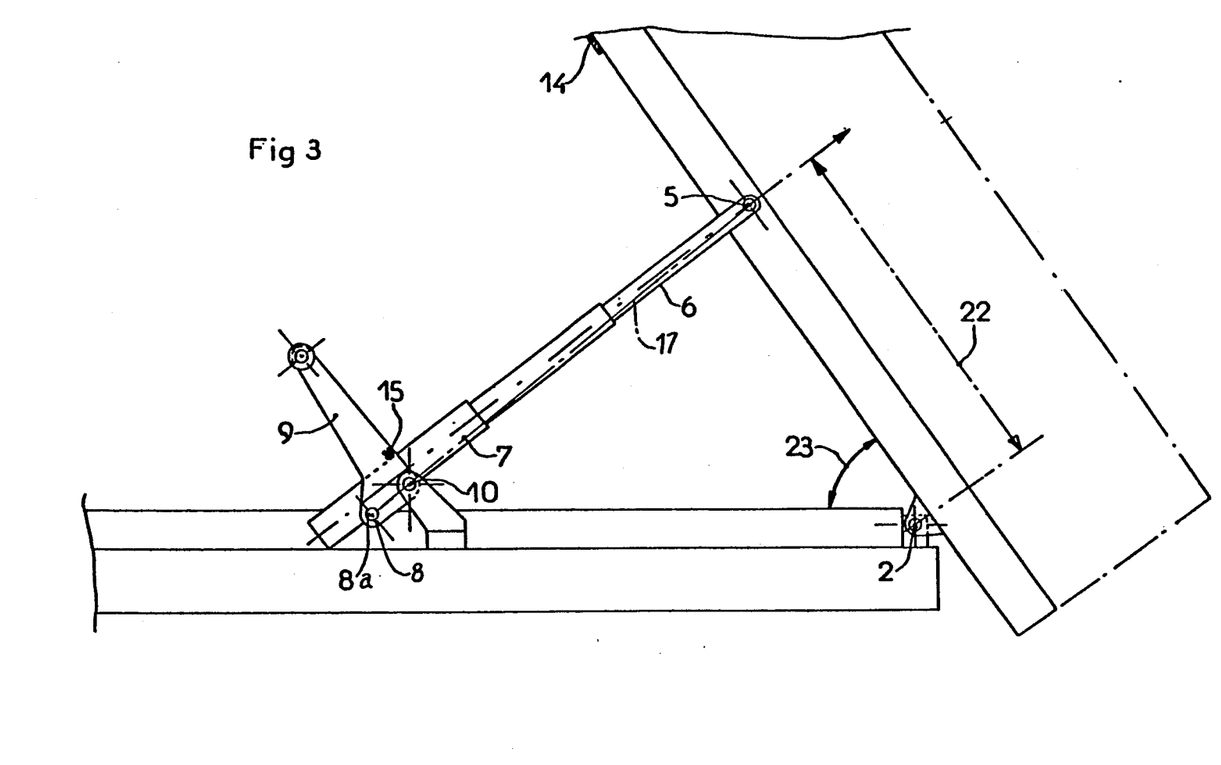

In FIGS. 1 to 3 we have shown a lower fixed chassis 1 with a tipping axle 2 at the rear on which a tilting tray 3 is hinged. The chassis 1 may be that of a transport vehicle, the tray 3 forming the base of a tipping body.

The tray 3 has an axle 5 on which the top of the rod 6 of an elevating thrustor is hinged, the lower part of the cylinder 7 of which has lateral trunnions 8.

The thrustor 6,7 is placed between two identical triangular push rods 9 which are superposed in the projection of the lateral views of the drawings. Each of these two push rods 9 have three apices, i.e.:

a first apex articulated on the axle 8a of the thrustor 6,7;

a second apex articulated on an axle 10 equipped with a bracket 11 on the chassis 1; and a third apex which holds the axle 12 of a roller 13 which runs against a thrust plate 14 on the inner surface of the tipping tray 3.

Finally, the push rods 9 are linked by a cross bar 15 above the cylinder 7 of the thrustor. A slight clearance is provided when the three axles 5, 10 and 8a are aligned on the same level.

The invention operates as follows:

In the rest position as shown in FIG. 1, the thrustor 6,7 is only slightly horizontally inclined between the chassis 1 and the tray 3 which rests on it. The largest arm located between axles 10 and 12 of each push rod 9, lies horizontally towards the front of the chassis 1.

When pressure is increased in the thrustor 6,7 to lengthen it, the roller 13 exerts a lift-off thrust 16 against the plate 14 which is directed from the bottom upwards, almost vertically. This lift-off thrust, therefore acts with maximum leverage along 16 in relation to the tipping axle 2. This allows a maximum reduction of the longitudinal thrust 17 which is then developed by the thrustor 6,7.

The tray 3 is lifted by the push rod 9 lifting round its fixed axle 10 (arrow 18). This position in the center of the piston stroke is maintained during the rest of the movement when the push rod 9 remains immobile in relation to the thrustor 6,7 and follows its oscillations. During this sequence of movements, and until the position shown in FIG. 3 is reached, it is the rigid assembly 6, 7, 9 which tilts around axle, which is fixed—meanwhile, the roller 13 comes away from the plate 14 which continues to rise with the tray 3.

The cross bar 15 prevents any unwanted tilting of the push rod 9 beyond the center position of the stroke, shown in FIG. 2, and any self induced tipping of the body.

Figure 4:
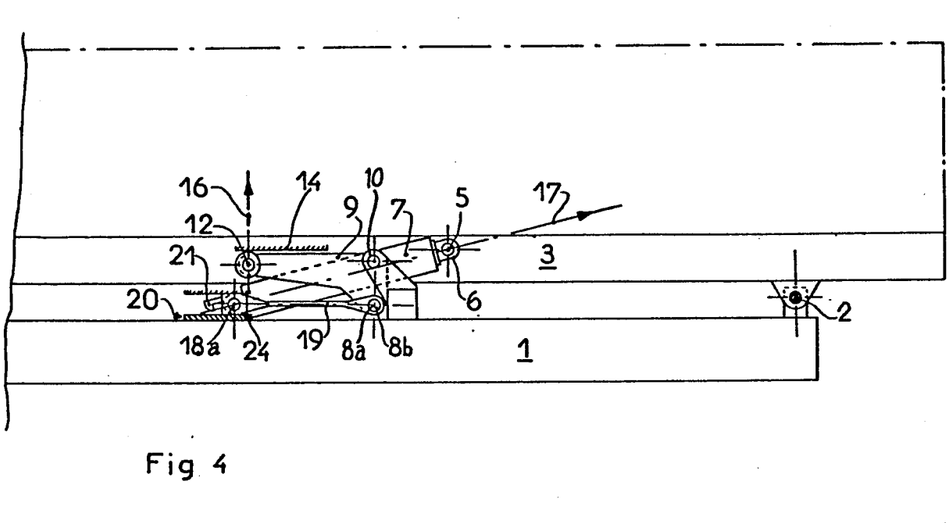
FIGS. 4 to 6 are similar views showing another embodiment of the invention with a tie rod.
Figure 5:
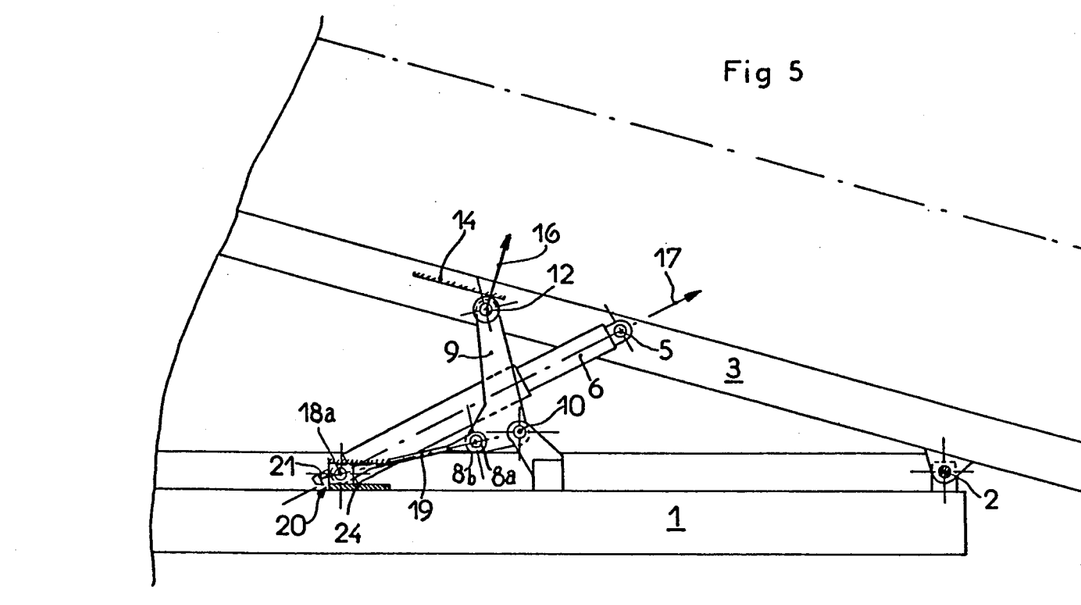
Figure 6:
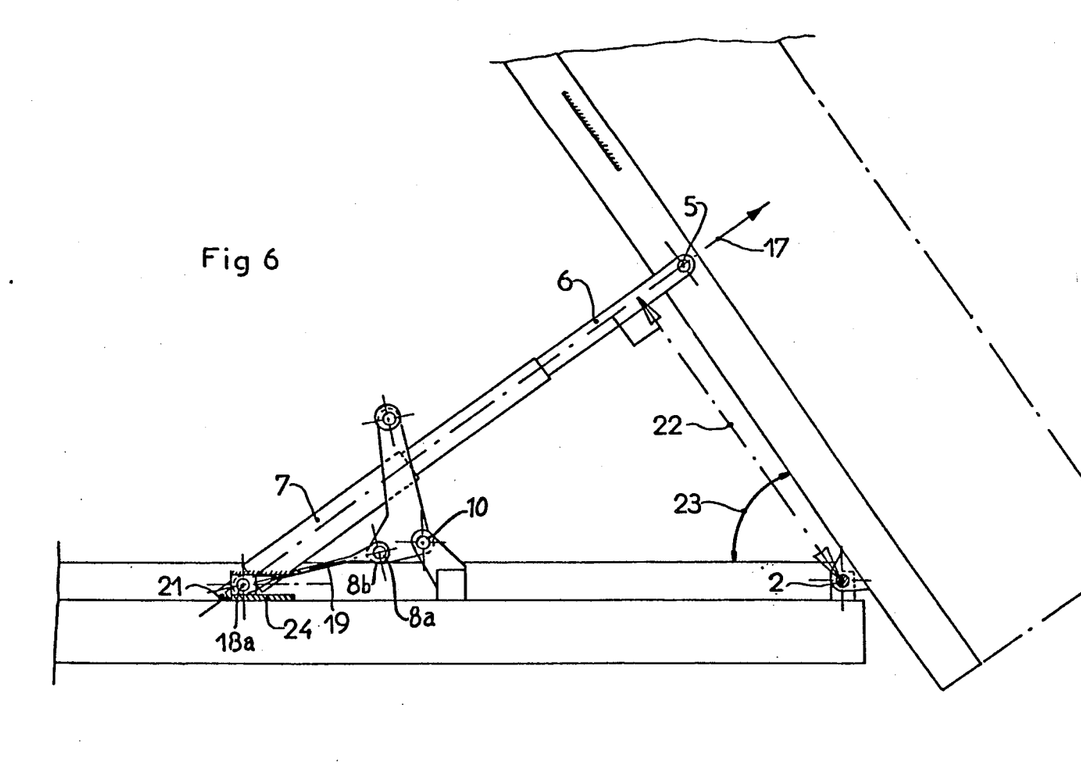

In the alternative preferred embodiment shown in FIGS. 4 to 6, the thrustor 6,7 no longer has lateral trunnions 8, but an axle 18a placed in a conventional manner to the bottom of the cylinder 7. This axle 18a is linked by two tie rods 19 situated on the thrustor 6,7 at the first apex 8b of the triangular push rods 9. The ends of the axle 18a slide along longitudinal slides 24 incorporated in the chassis 1. The end of the slides 24 form a hooked tooth 20 which, when the tray 3 ceases to rise, as shown in FIGS. 5 and 6, hooks into the latch 21 which protrudes under the cylinder 7 to which it is attached.

In this embodiment, it is no longer necessary to link the two push rods 9 with a thrust cross bar 15.

Operation is as follows:

Pressure is applied to the thrustor 6,7 when the assembly is in the rest position (FIG. 1), each tie rod 19 exercises traction on the axle 18a of the push rod 9 which, as before, creates an upward thrust 16 under the plate. The tray 3 lifts from the chassis and starts to rise both because of the thrust 16 and also under the direct thrust 17 which the thrustor 6,7 exercises on the axle 5.

During this lift, the axle 18a moves towards the rear between the two slides 24 until it reaches the position shown on FIG. 5 where the latch 21 hooks onto the tooth 20 of the slides. Now the three axles 10, 8a and 18a are aligned on the same level, this corresponds to the center of the piston stroke. They remain in this position, as do the push rods 9 during the rest of the movement until the position in FIG. 6 is reached. During the whole of this last phase, the tilting of the tray 3 occurs due to the single thrust 17 of the thrustor 6,7 which, having pivoted upwards now has considerable leverage 22 in relation to the axle 2.

The invention has, among others, the following advantages:

All things being equal, this tipping device has a high angle of inclination 23;

the efforts are multiplied at the lift-off from the chassis (FIGS. 1 and 4) due to the vertical thrust being added to the oblique thrust;

the kinematics described uses, not only the longitudinal action 17 of the thrustor 6,7 but also its reaction, which working about the axis 8a produces the take-off thrust 16;

the stress on the various parts and joints is reduced by an amount from 30 to 65% that of a prior art device at the take-off;

the effort 17 of the thrustor 6,7 remains almost constant from FIGS. 1 through 3 and 4 through 6;

this reduction of effort at take-off allows a piston with a smaller bore to be used; and if the push rods 9 are set on either side of the single central piston they will act as guides on each side of the cylinder 7 to prevent any transversal deflection.

It is obvious the thrustor 6,7 can be of any conventional type, single or multiple expansion (as in FIGS. 3 and 6). Guidance of the axle 18a in the slides 24 may be ensured by rollers or sliding blocks.

The tipping device could be mounted the other way around from the way shown in the drawing. In other words, the axis of the second axle 10 would be fixed on the upper tray 3 as well as the slides 24, whereas the thrust of the third axis 12 would be exercised on one of the plates 14 which are an integral part of the lower chassis 1.

The tipping device could also be placed front to back, the thrustor 6,7 being towards the front and the push rods 9 at the rear of the vehicle.

The same kinematics could be obtained with two lateral pistons and a single central push rod.

We claim:

1. A tipping device mounted to a chassis of a vehicle, comprising:

a tipping tray;

thrustor means having a first and second end, said thrustor means being connected pivotally at said first end to one of said tipping tray and said chassis;

means for actuating said thrustor means located adjacent said chassis of said vehicle;

a first bracket attached to the other of said tipping tray and said chassis;

a first push rod having a first, a second and a third apex, said second end of said thrustor means being pivotally connected to said first apex of said first push rod;

said first bracket being pivotally connected to said second apex of said first push rod; and a roller rotatably attached to said third apex of said first push rod for applying thrust from said first push rod contactingly upon said one of said tipping tray and said chassis when said thrustor means is actuated;

whereby when said tipping tray is lifted by said tipping device to a position where said roller disengages contact with said one of said tipping tray and said chassis, said first and second apices of said first push rod are aligned with said first end of said thrustor means.

2. The tipping device of claim 1, further comprising a pivot between said chassis and said tipping tray, said pivot being spaced from said tipping device.

3. The tipping device of claim 2, wherein said thrustor means is pivotally connected to said tipping tray; said bracket is attached to said chassis; and said application of thrust by said roller is in a direction toward said tipping tray.

4. The tipping device of claim 3, further comprising a plate on said tipping tray for contacting said roller.

5. The tipping device of claim 1, further comprising a second push rod having a first, a second and a third apex, the other end of said thrustor means being pivotally connected to said first apex of said second push rod; and a second bracket attached to the other of said tipping tray and said chassis, said second bracket being pivotally connected to said second apex of said second push rod, said first and second brackets being located on opposite sides of said thrustor means, said roller being rotatably attached to said third apex of said first and second push rods, said first and second push rods being located on opposite sides of said thrustor means.

6. The tipping device of claim 5, further comprising a cross bar connected to each of said first and second push rods for preventing relative tilting therebetween.

7. The tipping device of claim 6, further comprising a transversal axle received by said first apices of said first and second push rods and received by said second end of said thrustor means for preventing any translational movement of said first and second push rods relative to each other.

8. The tipping device of claim 1, wherein said thrustor means comprises a first and a second thrustor each having a first and second end, said second thrustor being connected at said first end to said one of said tipping tray and said chassis, said second thrustor being connected at said second end to said first apex of said first push rod, said first and second thrustors being located on opposite sides of said first push rod.

9. A tipping device mounted to a chassis of a vehicle, comprising:
   a tipping tray;
   thrustor means having a first and second end, said thrustor means being connected pivotally at said first end to one of said tipping tray and said chassis;
   means for actuating said thrustor means located adjacent said chassis of said vehicle;
   a first bracket attached to the other of said tipping tray and said chassis;
   a first push rod having a first, a second and a third apex; said first bracket being pivotally connected to said second apex of said first push rod;
   a first tie rod having one end and an opposite end, said first tie rod being pivotally connected at said one end thereof to said second end of said thrustor means, said opposite end of said first tie rod being pivotally connected to said first apex of said first push rod;
   means mounted to said other of said tipping tray and said chassis for guiding translational movement of said first tie rod in response to actuation of said thrustor means; and
   a roller rotatably attached to said third apex of said first push rod for applying thrust from said first push rod contactingly upon one of said tipping tray and said chassis when said thrustor means is actuated;
   whereby when said tipping tray is lifted by said tipping device to a position where said roller disengages contact with one of said tipping tray and said chassis, said first and second apices of said first push rod are aligned with said one end of said first tie rod.

10. The tipping device of claim 9, further comprising a pivot between said chassis and said tipping tray, said pivot being spaced from said tipping device.

11. The tipping device of claim 10, wherein said thrustor means is pivotally connected to said tipping tray; said first bracket is attached to said chassis; and said application of thrust by said roller is in a direction toward said tipping tray.

12. The tipping device of claim 11, further comprising a plate on said tipping tray for contacting said roller.

13. The tipping device of claim 9, wherein said means for guiding translational movement of said first tie rod is a transversal bearing.

14. The tipping device of claim 13, wherein said transversal bearing comprises a pair of slides; and a block connected to said one end of said first tie rod, said block being translatably guided between said pair of slides.

15. The tipping device of claim 14, further comprising a hook attached to said block for selectively hooking at least one slide of said pair of slides when said tipping tray is in a fully raised position.

16. The tipping device of claim 9, further comprising a second push rod having a first, a second and a third apex;
   a second bracket attached to the other of said tipping tray and said chassis, said second bracket being pivotally connected to said second apex of said second push rod, said first and second brackets being located on opposite sides of said thrustor means; said roller being rotatably attached to said third apex of said first and second push rods; said first and second push rods being located on opposite sides of said thrustor means; and
   a second tie rod having one end and an opposite end, said second tie rod being pivotally connected at said one end thereof to said second end of said thrustor means, said opposite end of said second tie rod being pivotally connected to said first apex of said second push rod, said first and second tie rods being located on opposite sides of said thrustor means.

17. The tipping device of claim 16, further comprising a cross bar connected to each of said first and second push rods for preventing relative tilting therebetween.

18. The tipping device of claim 9, wherein said thrustor means comprises a first and a second thrustor each having a first and second end, said second thrustor being connected pivotally at said first end to said one of said tipping tray and said chassis, said second thrustor being pivotally connected to said second end of said first tie rod, said first and second thrustors being located on opposite sides of said first push rod.

19. A tipping device mounted between a chassis of a vehicle and a tipping tray of said vehicle, comprising:
   thrustor means connected pivotally at one end to said tipping tray;
   means for actuating said thrustor means located adjacent said chassis of said vehicle;
   a first bracket attached to said chassis;
   a second bracket attached to said chassis, said first and second brackets being located on opposite sides of said thrustor means;
   a first push rod having a first, a second and a third apex, the other end of said thrustor means being pivotally connected to said first apex of said first push rod, said first bracket being pivotally connected to said second apex of said first push rod;
   a second push rod having a first, a second and a third apex, the other end of said thrustor means being pivotally connected to said first apex of said second push rod, said second bracket being pivotally connected to said second apex of said second push rod, said first and second push rods being located on opposite sides of said thrustor means;
   a roller rotatably attached to said third apices of said first and second push rods for applying thrust from said first and second push rods contactingly upon said tipping tray when said thrustor means is actuated;
   a plate on said tipping tray for contacting said roller;
   a transversal axle received by said first apices of said first and second push rods and received by said second end of said thrustor means for preventing translational movement by said push rods relative to each other; and
   a cross bar mounted to each of said first and second push rods for preventing relative tilting therebetween;
   whereby when said tipping tray is lifted by said lifting device to a position where said roller disengages contact with said tipping tray, said first and second apices of said first and second push rods are aligned with said first end of said thrustor means.

* * * * *

UNITED STATES PATENT AND TRADEMARK OFFICE
CERTIFICATE OF CORRECTION

PATENT NO. : 4,762,370

DATED : August 9, 1988

INVENTOR(S) : Antoine Corompt et al.

It is certified that error appears in the above-identified patent and that said Letters Patent is hereby corrected as shown below:

In the Abstract, line 6, after "slide" insert a comma -- , --.
line 7, delete "to".

Column 2, line 58, after "therefore" insert a comma -- , --.
Column 6, line 64, delete "lifting" and insert -- tipping --.

Signed and Sealed this

Ninth Day of May, 1989

Attest:

DONALD J. QUIGG

*Attesting Officer*  Commissioner of Patents and Trademarks